Oct. 28, 1952     S. S. COOK ET AL     2,615,359
MEANS FOR CUTTING PROJECTING GEAR TEETH
Filed Nov. 27, 1946     5 Sheets-Sheet 1
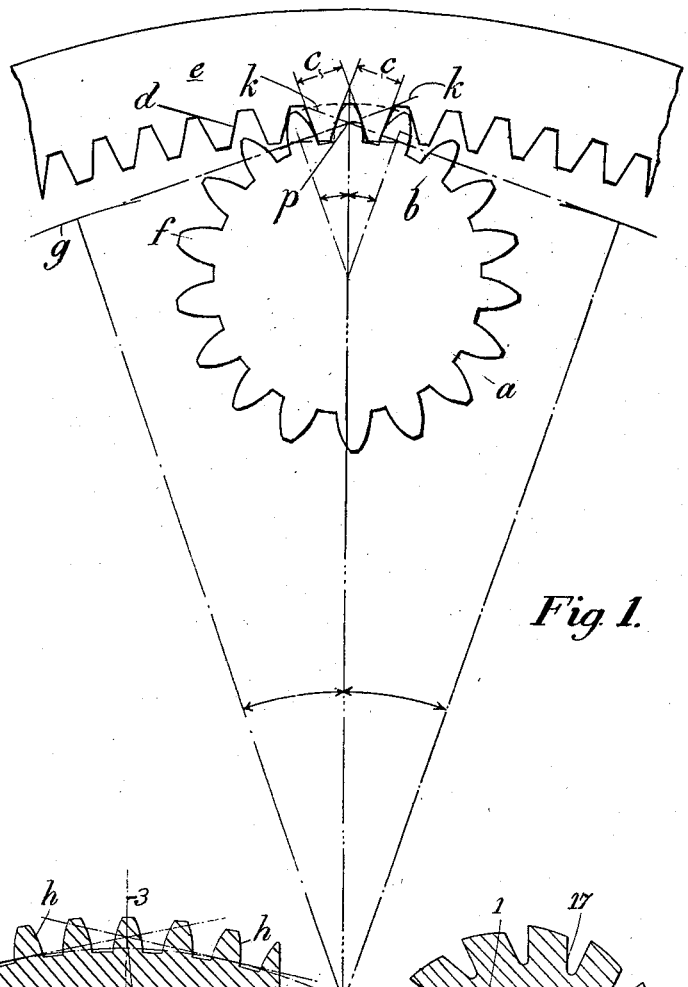
Fig. 1.
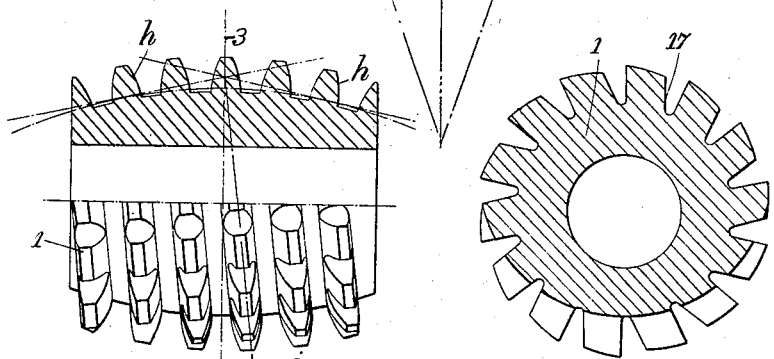
INVENTORS
STANLEY SMITH COOK
LOUIS MORTIMER DOUGLAS
BY Sawyer & Kennedy
ATTORNEYS

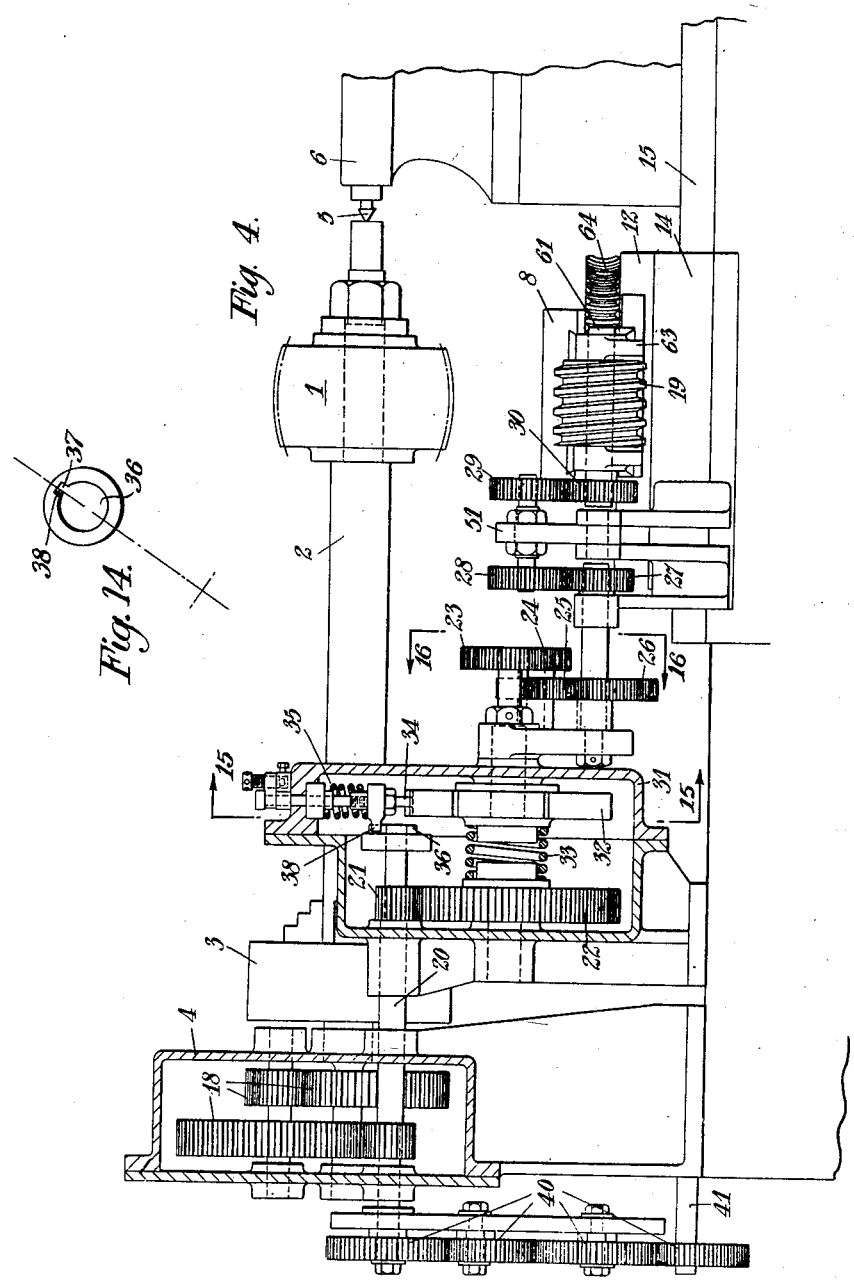

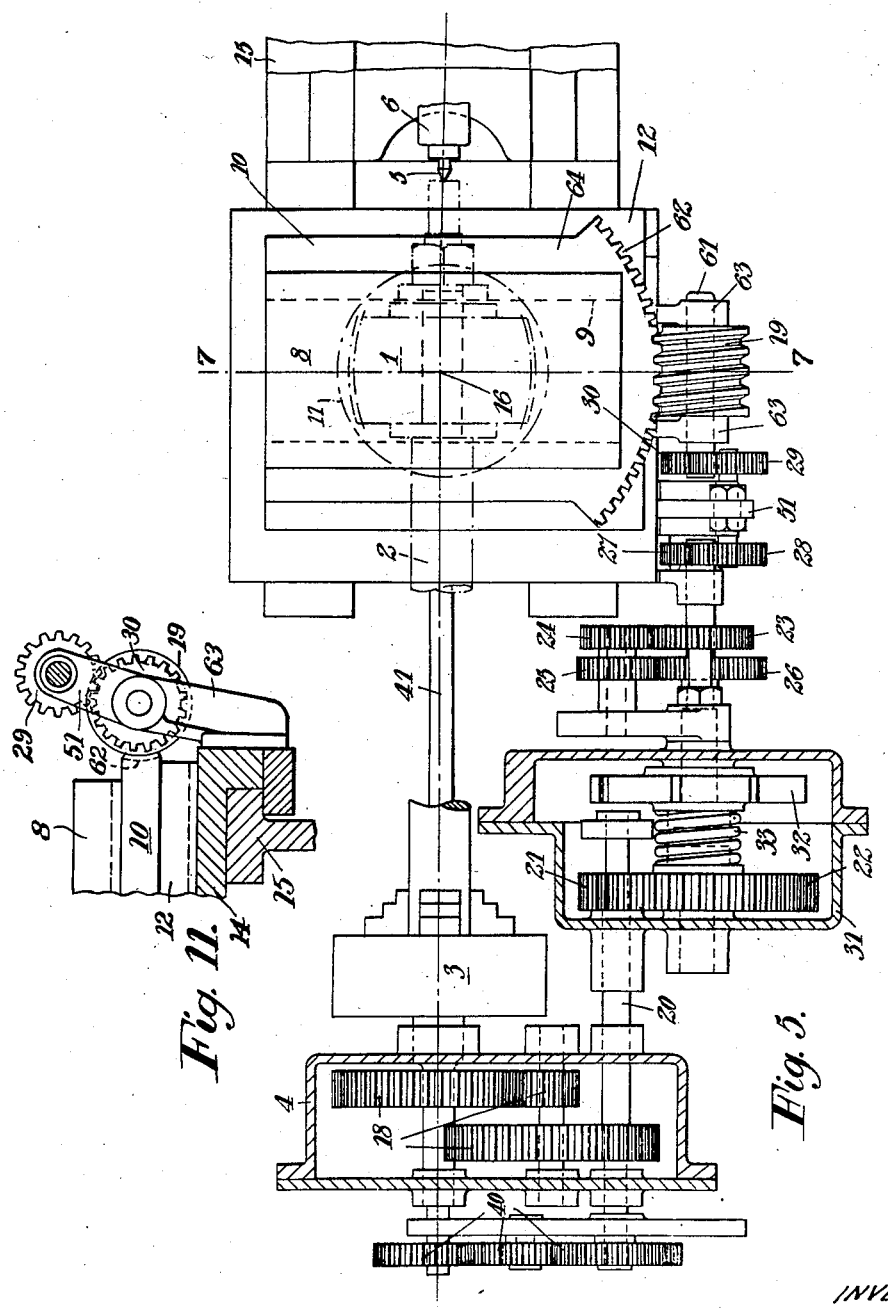

Oct. 28, 1952     S. S. COOK ET AL     2,615,359
MEANS FOR CUTTING PROJECTING GEAR TEETH
Filed Nov. 27, 1946                          5 Sheets-Sheet 4
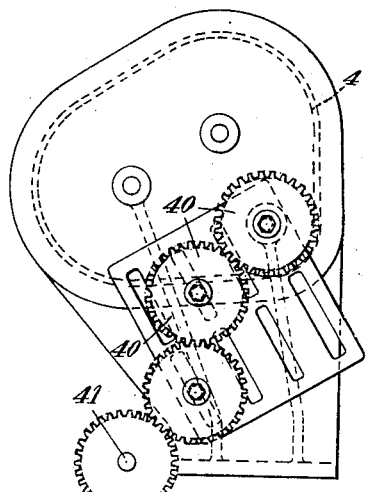
Fig. 12.
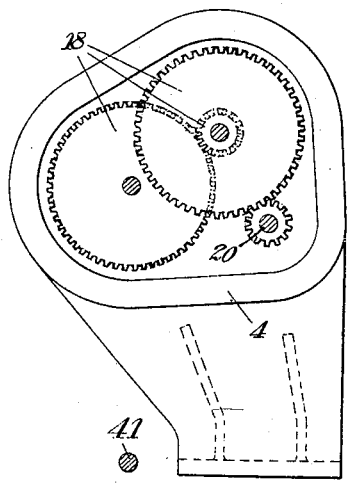
Fig. 13.
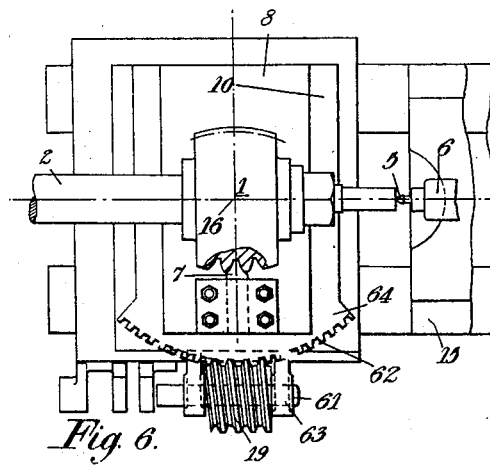
Fig. 6.
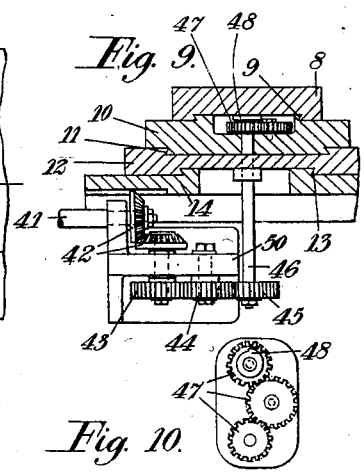
Fig. 9.
Fig. 10.
INVENTORS
STANLEY SMITH COOK
LOUIS MORTIMER DOUGLAS
BY Sawyer Kennedy
ATTORNEY Oct. 28, 1952 S. S. COOK ET AL 2,615,359
MEANS FOR CUTTING PROJECTING GEAR TEETH
Filed Nov. 27, 1946 5 Sheets-Sheet 5
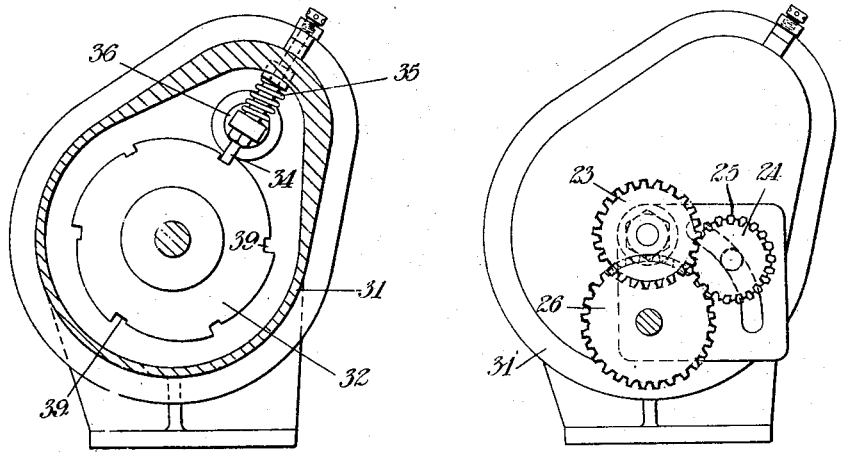
Fig. 15. Fig. 16.
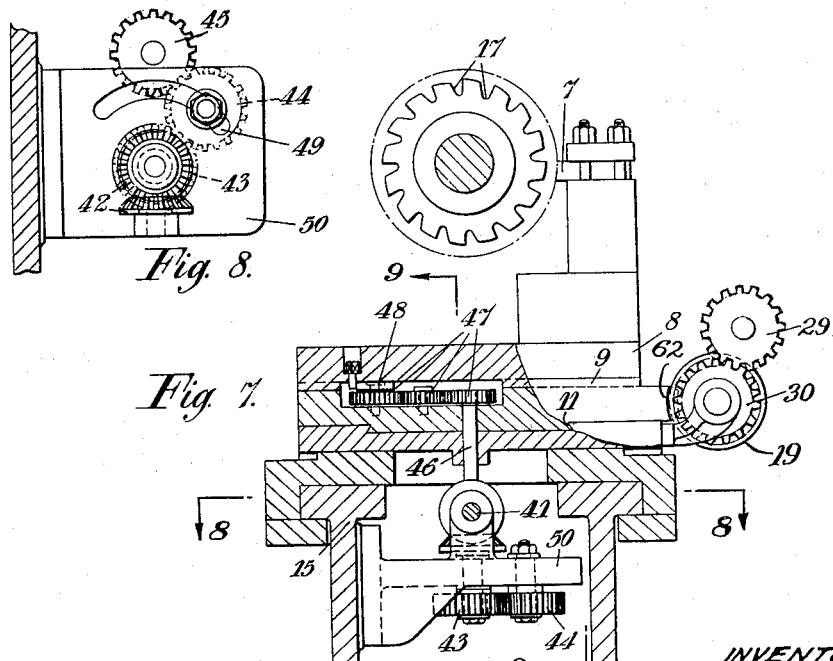
Fig. 8.
Fig. 7.
INVENTORS
STANLEY SMITH COOK
LOUIS MORTIMER DOUGLAS
BY Sawyer & Kennedy
ATTORNEYS Patented Oct. 28, 1952

2,615,359

UNITED STATES PATENT OFFICE 2,615,359

MEANS FOR CUTTING PROJECTING GEAR TEETH

Stanley Smith Cook and Louis Mortimer Douglas, Wallsend-on-Tyne, England, assignors to The Parsons Marine Steam Turbine Company Limited, Wallsend-on-Tyne, England Application November 27, 1946, Serial No. 712,606
In Great Britain September 14, 1945

Section 1, Public Law 690, August 8, 1946
Patent expires September 14, 1965

3 Claims. (Cl. 82—19)

1

This invention relates to means for cutting internally projecting gear teeth of concave involute form. Kinematically correct transmission of motion is attainable when such teeth engage externally projecting convex involute teeth having the same basic pitch, that is, the same pitch measured along lines tangential to the base circles of the involutes. The concave involute teeth on the ring having the internally projecting teeth cannot be generated with the conventional type of hob, the teeth of which are all of the same pitch and the same relative disposition in relation to the axis. They can be formed by what is known as the "Fellows' Shaper" process, in which a cutter having the form of a pinion with convex involute teeth is reciprocated along its axis to cut the teeth lengthwise and the teeth of the work are generated by rotating the cutter and the work so that they have the same circumferential speed at the pitch point.

The cutter can be made of any diameter up to the diameter of the work itself but it is usually made much smaller for convenience.

The intermittent motion of this process is disadvantageous as compared with the continuous uninterrupted motion of the hobbing process, and the object of the invention is to produce a cutter or hob by which the concave involutes of internally projecting teeth can be formed by the continuous motion process known as "hobbing."

In accordance with the present invention, the hob employed may be of the type in which the teeth lie at equal intervals along a helical path around the hub circumference with the result that the successive cutting edges cut at equal intervals in succession along the line of action.

The invention consists in machines for producing hobs as set forth in the claims appended hereto.

Referring to the accompanying diagrammatic drawings:

Figure 1 illustrates an involute toothed pinion engaging conjugate inwardly projecting teeth of a ring.

Figure 2 is a sectional elevational view of a hob constructed in accordance with the present invention.

Figure 3 is a cross-sectional view thereof on the line 3—3 of Figure 2.

Figure 4 is a side elevational view partly in section of one form of machine in accordance with the present invention for producing a hob such as illustrated in Figures 2 and 3.

Figure 5 is a plan view partly in section of the machine of Figure 4.

2

Figure 6 is a part plan view thereof.

Figure 7 is mainly a transverse section through a plane 7—7 of Figure 5.

Figure 8 is a plan view of part of Figure 7, showing parts below the line 8—8 thereof.

Figure 9 is a part longitudinal sectional view thereof, and is taken on the line 9—9 of Figure 7.

Figure 10 is a plan view of part of Figure 9.

Figure 11 is a part transverse sectional view, showing details of the mechanism as viewed from the right of Figure 6.

Figure 12 is an end view, looking from the left of Figure 5.

Figure 13 is a view similar to Figure 12 but with the cover plate of head stock 4 and parts outside the same removed so as to show more clearly details of the internal gearing;

Figure 14 is a detail view showing the cam 36 of Figure 4 in profile;

Figure 15 is a section on the line 15—15 of Figure 4; and

Figure 16 is a detail section on the line 16—16 of Figure 4.

In Figure 1 is illustrated a pinion (or cutter) $a$ with convex involute teeth $b$ having the same basic pitch $c$ as the concave involute teeth $d$ of a ring $e$ and when these two elements rotate in the same direction and at the same circumferential speed at the pitch point $p$ the contact between the engaging teeth moves uniformly along the lines of action $k$ each of which is part of the common tangent to the base circles $f$ and $g$ of the two sets of teeth.

A suitable hob for cutting teeth internally projecting from a ring such as the ring $e$ of Figure 1 which will produce true concave involutes is shown in Figures 2 and 3. The cutting edges $h$ are all of a similar convex involute form disposed on a helical path $j$ around the circumference of the hob and so orientated that in planes containing the axis of the hob they lie normally to the tangents of the base circle of the involute profiles and are equally pitched along that tangent, that is, they have the same basic pitch $c$. That is to say, in planes containing the axis of the hob as in the upper part of Figure 2, the cutting edges have the same form and disposition as those of a pinion in a plane transverse to its axis, such as pinion $a$, in Figure 1.

Preferably the cutting edges or teeth of the hob are equally spaced along the helical path on which they lie.

A hob as above described will produce conjugate concave involute teeth, such as $d$ in a ring such as $e$, Figure 1, if properly disposed relatively thereto, and both elements are rotated at the proper relative speeds.

The circular arc in the cutting plane on which the cutting edges are equiangularly pitched may be of any radius less than that of the work, that is of the gear to be cut, but it is preferably made reasonably small for convenience of manufacture and operation.

A modified form of hob may be employed for cutting gear teeth having a helical angle different from that of the hob thread wherein the profiles and disposition of the hob teeth in a plane through the axis of the hob is a projection through the appropriate angle of a section through an involute toothed pinion engaging the work, the said section being in a plane transverse to the axis of the work.

One construction of machine embodying the present invention for producing hobs as above described is illustrated in Figures 4–16 in which the work (hob) 1 is mounted on a mandrel 2, which is secured to the chuck 3 by the usual means. The chuck rotates in the headstock 4 and the mandrel 2 is carried at the other end on a centre 5 or other type bearing in the tailstock 6.

The tool 7 is carried on a slide 8 which is capable of rectilinear motion on guides 9 in the saddle 10, the motion being at right angles to and radial to the axis 16 about which the saddle rotates. The latter is capable of rotation on the circular guides 11 in the saddle 12 which in turn is displaced transversely to the axis of the work along guides 13 on the saddle 14 which is mounted on the bed 15 of the machine. By these provisions the tool 7 is capable of moving about the axis 16 of the circular guides 11 and moving radially to the axis 16, the latter motion being for the purpose of producing simultaneously relief on both flanks and the periphery of the hob teeth, and can be accomplished by any of the means commonly employed on relieving lathes. Means are provided for producing three motions, namely, rotation of the work on its own axis and two motions of the tool in a plane containing the axis of the work one motion arcuate about a center which lies at or on the opposite side of the axis of the work and the other an intermediate to and fro motion radial to the center of the arcuate motion, the mechanization producing these three motions being interconnected to bring them into proper corelation as regards extent and sequence.

For the purpose of producing a hob of the form required it is necessary that the tool should be given an intermittent rotary motion about the axis 16, this motion being a certain slight fixed amount, every time the work 1 rotates through the angular pitch of the flutes or gashes 17. That is to say, if, as shown in Figure 7, the hob has sixteen flutes, the slight intermittent rotary motion of the tool about the axis 16 must occur every sixteenth of a revolution of the work 1.

The drive for this intermittent motion is in this case from the chuck 3 through gears 18 and is transmitted to the worm 19 through shaft 20 and the gears 21, 22, 23, 24, 25, 26, 27, 28, 29 and 30. The gear 30 is secured to the shaft 61 to which the worm 19 is secured and which is carried in bearings 63 attached to saddle 12. The worm engages worm wheel teeth 62 in the sector 64 integral with or attached to saddle 10.

The frequency of the intermittent movements of the tool 7 about the axis 16, per revolution of the work 1, is obtained by the ratio of the gears 21, 22. The intermittent motion is produced by the apparatus in casing 31. The shaft 20 drives the indexing cam 32 through gears 21, 22, and the coil spring 33. The cam is engaged by detent 34 which is pressed radially into contact by the spring 35. The detent is disengaged momentarily once per revolution of shaft 20 by cam 36 secured to and rotating with shaft 20, the projection 37 engaging an arm 38 on the detent 34. The members 37 and 38 are so shaped that the disengagement of the detent is of very short duration. The gears 21 and 22 are so chosen that one revolution of shaft 20 produces an angular movement of wheel 22 equal to the angular pitch of the stops 39 on cam 32. The latter, however, is prevented from moving by the detent 34 until the spring 33 is wound up by this angular movement of wheel 22, when the detent is withdrawn by cam 36 to allow the cam 32 to commence rotation. The retraction of the detent, however, is of such short duration that before cam 32 is moved to the next stop 39 the detent has re-engaged the periphery of the cam and prevents it from passing beyond the next stop.

As already stated the relieving may be accomplished by any of the well known means. In the present instance a series of gears 40 interconnects the shaft 20 and shaft 41 at the appropriate speed and the latter, passing longitudinally through bed 15 of the machine, as shown in Figures 5 and 7–10, drives through bevels 42, gears 43, 44, 45, the vertical shaft 46 and gears 47, the cam 48. The latter moves the saddle 8 on guides 9 against the action of a spring (not shown) which retracts saddle 8 at the end of each revolution of cam 48.

In the drawing the axis 16 about which the tool rotates passes through the axis of rotation of the work so that the hob produced corresponds to a pinion of the same radius as the hob. The radius on which the hob teeth lie, however, in a plane through the axis of the hob, can be made greater or less, irrespective of the hob diameter, by moving the saddle 12 transversely until the axis 16 lies at the appropriate distance from the hob teeth to make the latter lie on an arc of the required radius. In order to accommodate this translation the idler 44 interconnecting gears 43 and 45, is moved round the arc 49 in the supporting frame 50. The arm 51 supporting the gears 28, 29, is swung round to enable these gears 28, 29, to re-engage gears 27, 30.

In order to manufacture hobs with different numbers of flutes without modification to the gears 21, 22, and indexing cam 32, the gears 18 can be changed to vary the speed of the shaft 20 in relation to the speed of the work 1, and in order to vary the amount of angular movements of the tool about the axis 16 the gears 23, 24, can be changed to vary the relation between the motion of the indexing cam 32 and the worm 19.

In the machine as above described while the cutting edges of the hob produced will lie in the helical path $j$, the body portion of each individual tooth will be symmetrical about a circumferential line. If desired the body of each tooth can be made symmetrical about the helical path $j$ by giving the saddle 8 on which the tool 7 is carried a slight continuous longitudinal movement during the formation of each tooth.

The tool used to produce the hob is an ordinary profile cutter but it may be any other form of tool, for example, a profile grinder.

There is no axial motion of a saddle when producing the hob. Apart from the reciprocating movement of the slide to give simultaneous flank and peripheral relief to the hob teeth, which is the same in both cases, when cutting the conventional hob the work has rotary motion and the tool axial motion, while in cutting hobs by means of machines embodying the present invention the work has rotary motion and the tool has a rotary motion, only about the axis on which the saddle 10 rotates.

While the end to end motion of the tool 7 and the to and fro relieving motion of the tool are normally in a plane containing the axis of the work and this is the theoretically correct plane in which they should operate, a slight departure from this plane will have such a small effect on the accuracy of the work that for practical purposes it would produce a satisfactory result.

We claim:

1. A machine for producing a hob for cutting internally projecting gear teeth of concave involute form, comprising a lathe slide rest, cross slide thereon, a saddle associated with said cross slide, a circular guide for said saddle, a tool holder carried on said saddle, the cross slide being adjustable to locate the axis of movement of the saddle as guided by the circular guide in a position intersecting the axis of rotation of the lathe or on the far side thereof with reference to the tool holder, means for imparting intermittent rotary motion to said saddle proportional to the rotation of the work between cuts on successive hob teeth and means for relieving both sets of flanks of hob teeth simultaneously with the production of peripheral relief for said teeth, the last said means comprising means for moving the tool radially toward and away from the axis of rotation of the saddle.

2. A machine as claimed in claim 1 wherein the tool comprises an ordinary profile cutter.

3. A machine as claimed in claim 1 wherein the tool comprises a profile grinder.

STANLEY SMITH COOK.
LOUIS MORTIMER DOUGLAS.

REFERENCES CITED

The following references are of record in the file of this patent:

UNITED STATES PATENTS

| Number | Name | Date |
| --- | --- | --- |
| 1,512,631 | Muller | Oct. 21, 1924 |
| 1,695,762 | Hoagland | Dec. 18, 1928 |
| 1,980,444 | Scott | Nov. 13, 1934 |
| 2,024,433 | Davidson | Dec. 17, 1935 |
| 2,026,215 | Cone | Dec. 31, 1935 |

FOREIGN PATENTS

| Number | Country | Date |
| --- | --- | --- |
| 14,699 | Great Britain | 1907 |